May 5, 1970  TZUO-CHANG LEE  3,510,199
ELECTRO-OPTIC LIGHT BEAM DEFLECTOR
Filed Sept. 19, 1967  2 Sheets-Sheet 1
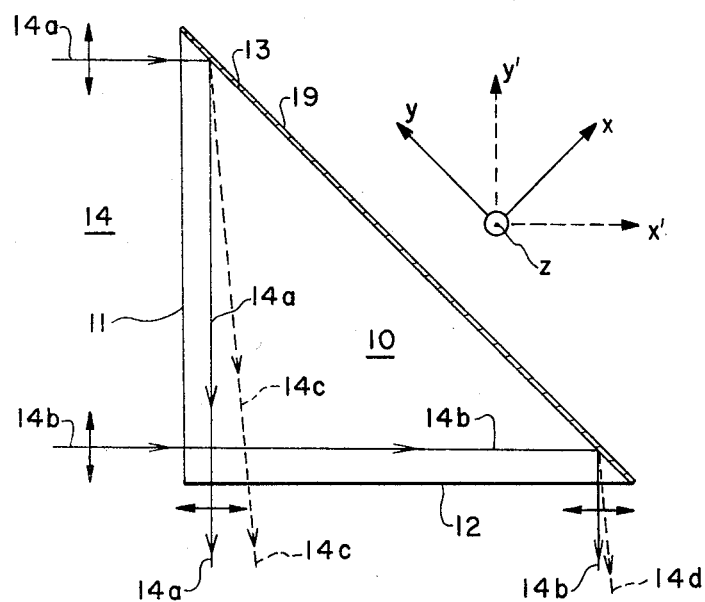
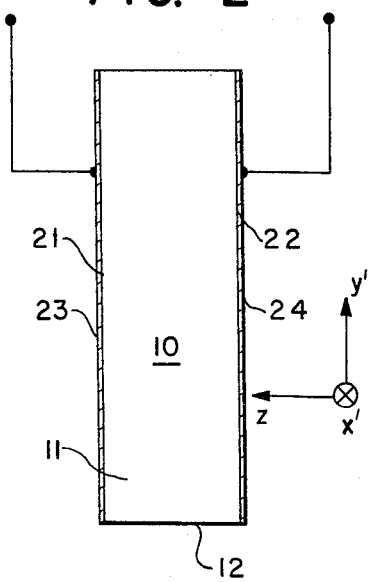
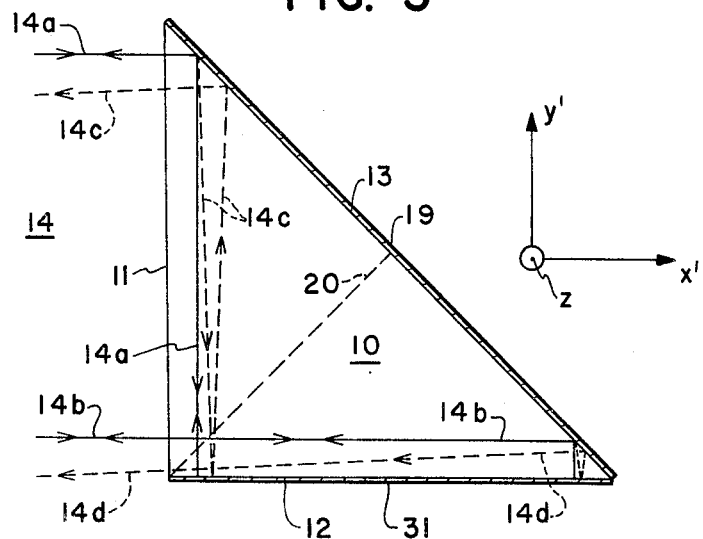
*INVENTOR.*
TZUO-CHANG LEE
BY
ATTORNEY May 5, 1970  TZUO-CHANG LEE  3,510,199
ELECTRO-OPTIC LIGHT BEAM DEFLECTOR
Filed Sept. 19, 1967  2 Sheets-Sheet 2
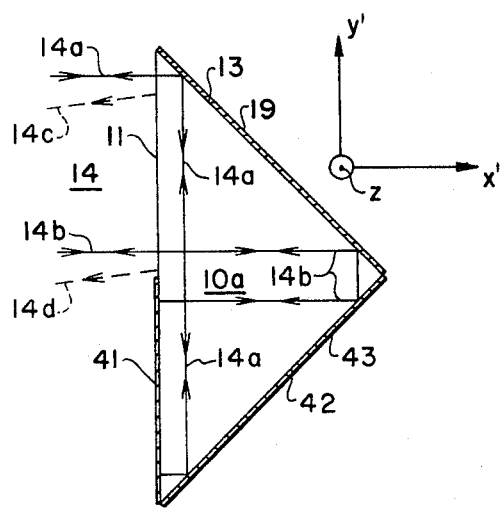
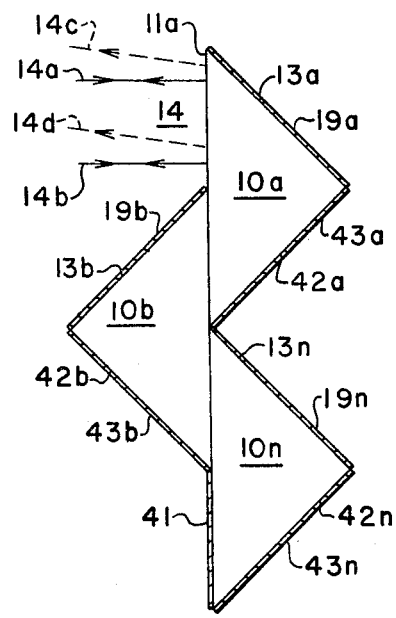
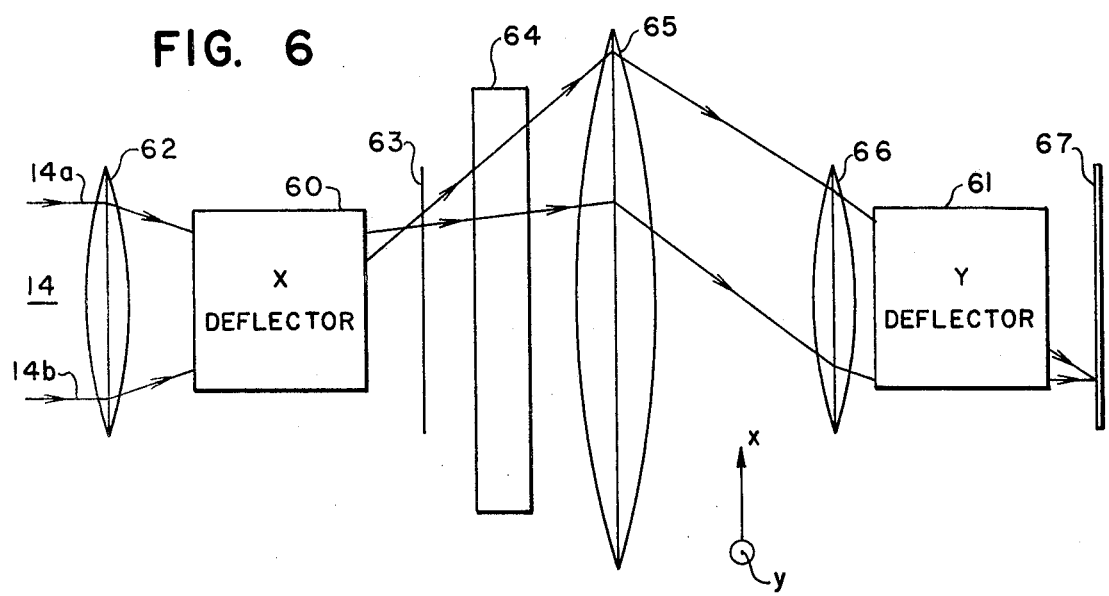
INVENTOR.
TZUO-CHANG LEE
ATTORNEY.

United States Patent Office 3,510,199
Patented May 5, 1970

3,510,199
ELECTRO-OPTIC LIGHT BEAM DEFLECTOR
Tzuo-Chang Lee, Eden Prairie, Minn., assignor to Honeywell Inc., Minneapolis, Minn., a corporation of Delaware
Filed Sept. 19, 1967, Ser. No. 668,864
Int. Cl. G02f 3/00
U.S. Cl. 350—160                                    11 Claims

ABSTRACT OF THE DISCLOSURE

A light beam deflector utilizing electro-optic (E-O) material having first and second electric field dependent indices of refraction parallel to first and second perpendicular axes within the material. A 45° right triangular prism is the basic structure. An electric field orientates the first axis parallel to the face of the prism upon which a light beam is incident. Light reflective means determines the light beam path within the E-O material. An array to achieve cumulative deflection and a two-dimensional deflection system are also disclosed.

BACKGROUND OF THE INVENTION

This invention relates to a light beam deflector for the analog control of a light beam's position. E-O light beam deflectors previously known in the art are generally based on one of two principles. A first type of deflector achieves deflection by passing a light beam across a boundary formed by E-O material having different electric field dependent indices of refraction. Refinements on this general principle include various arrangements of deflectors to achieve cumulative deflection and reflection means to direct a light beam across the boundary a plurality of times. A second type of deflector achieves deflection by applying a non-uniform electric field to a single E-O crystal. The non-uniform electric field induces a linear variation in the index of refraction in a direction transverse to the direction of propagation of the light beam. As a result, an index of refraction gradient is established and light rays entering the E-O crystal experience a relative phase shift. The incident light beam is deflected through an angle directly proportional to this phase shift. Certain disadvantages are inherent to deflectors based on either of these principles. For example, in the second type of deflector the application of a non-uniform field to the E-O crystal causes many problems to arise. Since neither type of deflector makes the most efficient use of E-O material, light beam deflection systems have been unnecessarily expensive.

SUMMARY OF THE INVENTION

The light beam deflector disclosed by the present invention utilizes a single piece of E-O crystal. A uniform electric field applied along the crystal's Z axis orientates two mutually first and second axes characteristic to the crystal. Parallel to both the first and second axes is an electric field dependent index of refraction. The basic structure of the light beam deflector in accordance with one preferred embodiment is a right triangular prism. second axes are aligned such that the first axis is parallel When a uniform electric field is applied, the first and to a first face and the second axis perpendicular to the first face. A light ray entering through the first face traverses the prism perpendicular to the first face until it impinges the third face. Light reflective means adjacent the third face redirects the light beam substantially parallel to the first face. Deflection of the light ray is achieved since a second electric field dependent index of refraction is perpendicular to the first face when the field is applied as noted above. Additional reflective means may be provided to further direct one outer ray of the light beam along a path having substantially the first index of refraction and an oppositely disposed outer ray along a path having substantially the second index of refraction as reoriented by the application of the electric field.

This arrangement provides the same number of resolvable spots and the same total deflection angle utilizing substantially less E-O material than previously used. Thus, the present invention makes efficient use of E-O material, does not contain a boundary, and a uniform field is applied to achieve light beam deflection. Furthermore, the light beam deflector as provided by the present invention may be used to position a light beam in an analog manner. As will be described hereinbelow, the basic light beam deflector may be incorporated in an array to achieve cumulative deflection or into a system to achieve two-dimensional deflection.

BRIEF DESCRIPTION OF THE DRAWING

For a better understanding of the invention, reference should be had to the accompanying drawing wherein:

FIG. 1 is a diagrammatic view of a preferred embodiment of the light beam deflector and illustrates the alignment of the E-O crystal's characteristics axes with and without an electric field applied;

FIG. 2 is a front view of the E-O crystal illustrated in FIG. 1 showing the positions of two electrodes thereon;

FIG. 3 is a diagrammatic view of a preferred embodiment of the light deflector having reflective coatings on two faces and showing the proper axes alignment when an electric field is applied;

FIG. 4 is a diagrammatic view of another preferred embodiment of the light deflector having reflective coatings entirely on two faces and a portion of a third face and showing the proper axes alignment when an electric field is applied;

FIG. 5 is a diagrammatic view of an array of light deflectors arranged to provide cumulative deflection;

FIG. 6 is a diagrammatic view of a two-dimensional light deflection system utilizing two of the arrays illustrated in FIG. 5.

DESCRIPTION OF THE PREFERRED EMBODIMENTS

Shown in FIG. 1 is a preferred structure, generally designated as 10, in the form of a 45° right triangular prism. Also shown is the proper axes orientation with and without an electric field applied. The prism has crystallographic, mutually perpendicular X, Y, and Z axes without an electric field applied. When an electric field is applied, the X and Y axes are rotated through an angle characteristic to the crystal and are illustrated as the X' and Y' axes. The orientation of the Z axis remains unchanged. The proper X' and Y' axes orientation is such that the Y' axis is substantially parallel to first face 11 of the prism 10 and the X' axis is substantially parallel to second face 12. A first electric field dependent index of refraction is parallel to the Y' axis and thus substantially parallel to face 11. A second electric field dependent index of refraction is parallel to the X' axis and thus substantially parallel to face 12.

In the embodiments shown, a light beam generally designated 14 is composed of numerous light rays where rays 14a and 14b are the two extreme rays bounding the beam in the plane of deflection. Light beam 14 enters prism 10 normal to face 11. Light beam 14 is polarized perpendicular to the Z axis and the direction of propagation. As can be seen in the drawing, extreme ray 14a follows a path having a substantially different electric field dependent index of refraction than the path of ray 14b. As illustrated in FIG. 1, the paths of light rays 14a and 14b have associated therewith the electric field dependent index of refraction along the axis which is parallel to the direction of polarization.

The case in which no electric field is applied to prism 10 will now be described. This case will be hereafter referred to as the undeflected case. Upon entering the prism, ray 14a traverses the prism to a third face 13 which has a reflective coating 19. Ray 14a is then intercepted by reflective coating 19 at an angle of incidence of 45°. Reflective coating 19 redirects ray 14a toward second face 12 at an angle of reflection of 45°. Ray 14a exits prism 10 normal to face 12. Oppositely disposed ray 14b traverses prism 10 in a similar manner. It is also redirected by reflective coating 19, such that the angle of incidence equals the angle of reflection. Ray 14b leaves prism 10 through face 12 parallel to ray 14a.

When an electric field is applied, the electric field dependent indices of refraction are oriented as previously described. Light ray 14a is incident upon face 11 and its path has an index of refraction in accordance with the orientation of the Y' axis, parallel to face 11. Ray 14a traverses prism 10 to face 13 whereupon it is reflected toward face 12 by reflective coating 19. The reflected path of ray 14a has an index of refraction in accordance with the orientation of the X' axis, parallel to face 12. Light ray 14a is reflected by reflective coating 19 such that the angle of incidence does not equal the angle of reflection. This may be seen by applying Snell's law at the point where ray 14a impinges reflective coating 19. Snell's law states that:

$$N_1 \sin \theta_1 = N_2 \sin \theta_2$$

where in this case:

$N_1$ is the index of refraction along the path of ray 14a before reflection, $N_2$ is the index of refraction along the path of ray 14a after reflection, $\theta_1$ is the angle of incidence of 45°, and $\theta_2$ is the angle of reflection.

At the point of reflection, the direction of ray 14a is changed from being substantially parallel to the X' axis to being substantially parallel to the Y' axis. Since the indices of refraction parallel to the X' and Y' axes are different, $N_1$ does not equal $N_2$ and therefore $\theta_1$ does not equal $\theta_2$. Thus, deflection of ray 14a occurs when an electric field is applied. The deflected ray 14a is shown reflected from reflective coating 19 as dotted ray 14c. Ray 14c exits the prism through face 12. By varying the electric field applied to prism 10, the relative difference between $N_1$ and $N_2$ can be varied. This permits deflection of a light beam to be controlled in an analog manner. The same case applies to oppositely disposed light ray 14b. That is, ray 14b is deflected from reflective coating 19 at an angle different from the angle of incidence and is shown as dotted ray 14d. Light rays 14c, 14d, and the numerous rays between the two extreme rays are deflected equal amounts.

It is preferable to have the cross-sectional area of light beam 14 approximately the same area as rectangular face 11. Thus, oppositely disposed, outer rays 14a and 14b of light beam 14 are near the upper and lower edges of face 11. This situation maximizes the optical path difference (O.P.D.) between extreme rays 14a and 14b. That is, if rays 14a and 14b are close to the opposite edges of face 11, their paths will have different indices of refraction for nearly their entire traversal of prism 10. The number of resolvable spots is directly proportional to the O.P.D. between extreme rays 14a and 14b. Thus, maximizing the O.P.D. between the extreme rays maximizes the number of resolvable spots which are obtainable from deflector 10.

FIG. 2 shows face 11 of prism 10 illustrated in FIG. 1. The axes orientation with an electric field applied is also shown. Prism 10 has first and second bases 21 and 22 on which electrodes 23 and 24 are attached. The electrodes are for applying an electric field to the prism along the Z axis. The Z axis is orientated perpendicular to bases 21 and 22. The manner in which electrodes 23 and 24 may be attached to bases 21 and 22, respectively, is well known in the art.

The light deflector shown in FIG. 3 is identical to that shown in FIG. 1 except for the addition of a light reflective coating 31 on second face 12. The reflective coating 31 redirects the impinging light beam back through the prism, substantially doubling the O.P.D. between the two extreme rays 14a and 14b. Thus, the additional reflective coating 31 doubles the number of resolvable spots and total deflection angle which are achievable with the deflector of FIG. 1.

The operation of the light deflector of FIG. 3 is similar to that of FIG. 1 The light beam 14 with oppositely disposed rays 14a and 14b is again linearly polarized perpendicular to the Z axis and the direction of propagation. The two extreme rays 14a and 14b are incident upon face 11. The rays then traverse the prism to face 13 where they are reflected by reflective coating 19 toward face 12. Without an electric field applied, the angle of incidence and the angle of reflection of rays 14a and 14b at reflective coating 19 are equal. Rays 14a and 14b then traverse the prism to face 12 and are reflected back along the same paths by reflective coating 31. The two extreme rays then leave prism 10 through face 11 in an undeflected state after again being redirected by reflective coating 19.

With an electric field applied, the angle of incidence and the angle of reflection at reflective coating 19 is no longer equal. Ray 14a is reflected at reflective coating 19 as dotted ray 14c and traverses the prism to reflective coating 31 which it strikes at an angle other than 90°. At the point where face 12 intercepts the light beam, the ray 14c is reflected with equal angles of incidence and reflection. Ray 14c is then reflected back toward face 13. Ray 14c intercepts reflective coating 19 a second time and further deflection occurs. Similarly, ray 14b when reflected initially from face 13 traverses to face 12 and is redirected by reflective coating 31. It also intercepts face 13 a second time and is redirected by reflective coating 19 toward face 11 with further deflection occurring. Rays 14c and 14d exit the prism through face 11 after being deflected through an equal angle. This embodiment needs substantially less crystal volume to achieve results equal to those obtained by prior art E-O light beam deflectors.

The light deflector 10a shown in FIG. 4 is the deflector of FIG. 3 bisected along dotted line 20. A reflective coating 41 is added to the lower half of face 11 and a reflective coating 43 is added to new face 42. The optical path difference between the two oppositely disposed light rays 14a and 14b is the same as in the embodiment illustrated in FIG. 3. Since the optical path difference remains the same, the number of resolvable spots obtainable is unchanged. However, the maximum deflection angle is doubled since deflection occurs upon reflection of the light beam at face 42 as well as face 13. Thus, in this embodiment, the volume of crystal necessary to achieve a given number of resolvable spots and to double the total deflection angle is further reduced from what was necessary in the prior art.

The principle of operation of the embodiment shown in FIG. 4 is similar to that already described. For simplicity, only rays 14a and 14b traversing the prism in an undeflected state have been shown. Light ray 14a enters prism 10a normal to face 11. It traverses the prism intercepting face 13 at 45° where reflective coating 19 directs it at a 45° angle of reflection toward face 42. At face 42, reflective coating 43 reflects ray 14a at a 45° angle of reflection toward face 11 which it intercepts at a 90° angle. Reflective coating 41 then directs light beam 14a back upon itself. Light beam 14a then follows the path just described until it exits prism 10a through the upper half of face 11. A similar traversal of the prism is made by ray 14b. That is, it enters face 11, traverses the prism to face 13, is reflected at face 13 toward face 43 and is then directed toward face 11. Reflective coating 41 then redirects ray 14b back along the same path.

When an electric field is applied causing different indices of refraction to be aligned parallel to the Y′ and X′ axis, an increment of deflection occurs whenever light rays 14a and 14b ae redirected by reflective coatings 19 and 43. Dotted light rays 14c and 14d exiting the prism from the upper half of face 11 have been added to illustrate a light beam in a deflected state.

The material of which the prisms of FIGS. 1 through 4 are composed may be any material which provides the deflectors with the characteristics described above. That is, it must have different electric field dependent indices of refraction along two properly orientated perpendicular axes. There are many materials with these characteristics. For example, material having 42m symmetry (Hermann-Mangin notation) such as Potassium Dihydrogen Phosphate (KDP) or Potassium Dideuterium Phosphate (KD*P) can be used. At the present, KD*P is the most preferred of the materials having 42m symmetry. Crystals having a 43m symmetry such as Gallium Arsenide (GaAs) may also be used.

The light reflective means has been described as reflective coatings on the appropriate prism faces. However, the reflective means may be any reflection means, such as properly located mirrors or simply total internal reflection when the prism is surrounded by a material with an appropriate index of refraction.

In FIG. 5 is shown an array of light deflectors, generaly designated 10a, 10b, . . . 10n. The deflectors are identical to the embodiments shown in FIG. 4. However, in this array, reflective coating 41 is included only on deflector 10n. The omission of light reflective coating 41 on all the deflectors except 10n permits the light beam to enter an adjacent prism in the array. For simplicity, the light rays have not been shown traversing the deflector array. Instead, light rays 14a and 14b have been shown entering and exiting face 11a in an undeflected state and also exiting face 11a as light rays 14c and 14d in a deflected state. The light deflectors in the array are arranged such as to provide cumulative deflection when an electric field is applied. Thus, an increment of deflection occurs at each of the reflective coatings 19a, 43a, 19b, 43b, . . . 19n and 43n. The deflectors are arranged so that the two extreme rays traverse the array along paths having different indices of refraction for substantially their entire traversal. The light rays are then redirected back by reflective coating 41 to double the O.P.D. of extreme rays 14a and 14b.

The system shown in FIG. 6 utilizes two arrays such as shown in FIG. 5 to achieve two-dimensional deflection. The X-deflector 60 is composed of one array and Y-deflector 61 of another array. In the diagrammatical system shown, lens 62 focuses an incoming light beam 14 into X-deflector 60. The X-deflector 60 deflects the light beam 14 in a first dimension, that is, the X direction. After leaving X-deflector 60, half-wave plate 63 rotates the plane of polarization of light beam 14 by 90°. Half-wave plate 63 may be situated at any point between X- and Y-deflectors 60 and 61. Half-wave plate 63 is necessary so that the proper polarization of light beam 14 is achieved before it enters Y-deflector 61. Cylindrical lens system 64 expands the beam in the Y direction. Lens 65 is a converging lens which permits rays 14a and 14b to enter converging lens 66 parallel to one another. Converging lens 66 focuses light beam 14 into Y-deflector 61. The Y-deflector 61 deflects the light beam 14 in a second dimension, that is, the Y direction. Light beam 14 is then displayed on display means 67 which is located at the focal plane of lens 66.

For Y-deflector 61, both the X and Y dimensions of the aperture are important since it has to hold deflection angles in both dimensions. If it is desired to have the number of resolvable spots in the X direction equal to the number of resolvable spots in the Y direction, a much higher voltage must be applied to Y-deflector 61 than to X-deflector 60. To solve the problem of applying a very high voltage to Y-deflector 61, thin prisms can be properly stacked together. For example, KDP prisms may be properly stacked by leaving the crystallographic Z-axis pointing up and down alternatively for successive layers of prisms. However, the sandwiched electrodes must now be transparent at the incident light beam's wave length. The electrodes must also possess substantially the same refractive index as the E-O crystal so that a light beam already deflected in the X direction will not be further deflected upon traversal of the electrode-crystal boundary.

While this invention has been disclosed with reference to a series of preferred embodiments, it should be understood by those skilled in the art that changes in form and detail may be made without departing from the spirit and scope of the invention. For example, it is quite obvious that the use of a system of lenses to focus the beam will increase the effectiveness of the prism described. Also, a half-silvered mirror or optical circulator may be necessary to separate the incident and the deflected rays.

The embodiments of the invention in which an exclusive property or right is claimed are defined as follows:

1. A light deflector comprising:
   an electro-optic light transparent crystal in the form of a triangular prism including first, second and third faces, first and second bases, and mutually perpendicular first, second and third axes wherein:
   said first face is adapted to transmit an incident light beam into said prism, and
   said crystal has a first electric field dependent index of refraction substantially parallel to said first axis and a second electric field dependent index of refraction substantially parallel to said second axis;
   light reflective means adjacent at least one of said second and third faces for intercepting a light beam incident upon said first face and transmitted through said prism for redirecting the light beam within said prism, and
   means for applying an electric field along said third axis, causing said first axis to become substantially parallel to said incident beam and said second axis to become substantially perpendicular to said incident beam whereby the light beam transmitted out of said prism is deflected with respect to its path when an electric field is applied to said prism.

2. The light deflector of claim 1, wherein said prism is a right triangular prism and said third axis is oriented perpendicular with respect to said first and second bases.

3. The light deflector of claim 2 wherein said light reflective means is a reflective coating on said third face and application of said electric field aligns said first axis substantially parallel to said first face and said second axis substantially perpendicular to said first face.

4. The light deflector of claim 2, wherein said light reflective means are adjacent said second and third faces.

5. The light deflector of claim 4, wherein said first and second faces are of substantially equal area.

6. The light deflector of claim 5, wherein said light reflective means are reflected coatings on said second and third faces and application of said electric field aligns said first axis substantially parallel to said first face and said second axis substantially perpendicular to said first face.

7. The light deflector of claim 1, wherein there is included reflective means adjacent a portion of said first face, whereby said first face is partially adapted to transmit a light beam into and out of said prism and partially adapted to intercept a light beam within said prism and redirect it through said prism back to the portion of said first face adapted to transmit a light beam.

8. The light deflector of claim 7 wherein said reflective means are adjacent said second and third faces; said second and third faces are of substantially equal area, and application of said electric field aligns said first axis substantially parallel to said first face and said second axis substantially perpendicular to said first face.

9. The light deflector of claim 8, wherein said light reflective means are reflective coatings.

10. An array of the light beam deflectors defined in claim 1, wherein a plurality of said deflectors are positioned and arranged adjacent each other to provide cumulative deflection of incident light.

11. A two-dimensional light beam deflection system comprising first and second deflectors of the type defined in claim 1 wherein said first deflector deflects an incident light beam in a first direction and said second deflector is positioned to intercept the light beam deflected in said first direction for further deflecting the light beam in a second direction.

References Cited

UNITED STATES PATENTS 3,437,400  4/1969  Rosenberg _____ 350—160 X

RONALD L. WIBERT, Primary Examiner

P. K. GODWIN, Jr., Assistant Examiner

U.S. Cl. X.R.

350—286